D. O. BARRETT.
ENGINE CYLINDER AND BED.
APPLICATION FILED JAN. 4, 1918.

1,329,878.

Patented Feb. 3, 1920.
3 SHEETS—SHEET 1.

WITNESSES
Oliver W. Holmes
A. L. Kitchin.

INVENTOR
Dwight O. Barrett,
BY
ATTORNEYS

D. O. BARRETT.
ENGINE CYLINDER AND BED.
APPLICATION FILED JAN. 4, 1918.

1,329,878.

Patented Feb. 3, 1920.
3 SHEETS—SHEET 2.

WITNESSES

INVENTOR
Dwight O. Barrett
BY
ATTORNEYS

UNITED STATES PATENT OFFICE.

DWIGHT O. BARRETT, OF LIMA, OHIO.

ENGINE CYLINDER AND BED.

1,329,878.  Specification of Letters Patent.  Patented Feb. 3, 1920.

Application filed January 4, 1918. Serial No. 210,326.

*To all whom it may concern:*

Be it known that I, DWIGHT O. BARRETT, a citizen of the United States, and a resident of Lima, in the county of Allen and State of Ohio, have invented a new and Improved Engine Cylinder and Bed, of which the following is a full, clear, and exact description.

This invention relates to internal combustion engines of any desired type, either horizontal or vertical, and has for an object to provide an improved construction whereby the cylinder is held in position without presenting unsightly flanges and bolts at the point of connection.

Another object of the invention is to provide an improved construction wherein the cylinder will fit the body at two points whereby a perfect alinement is easily secured.

Figure 1:
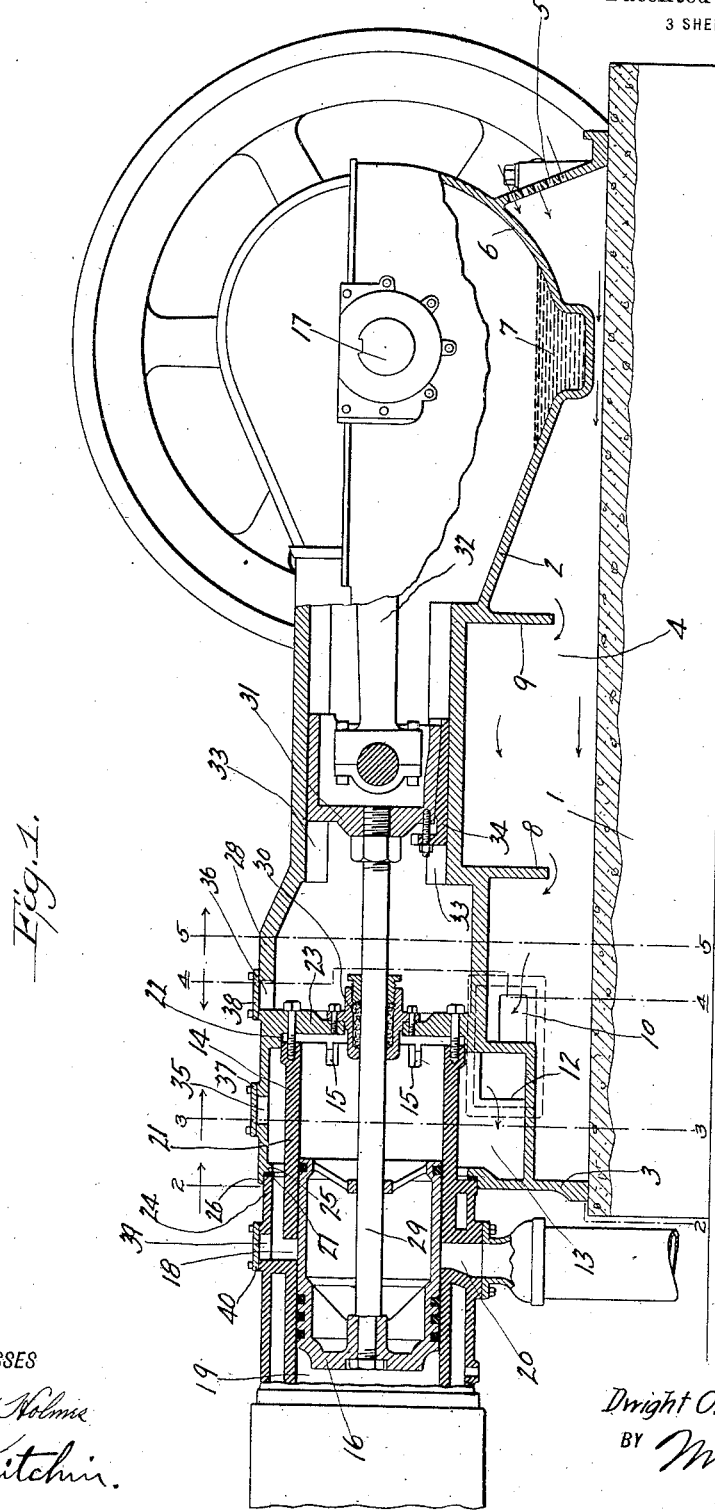
Figure 1 is a longitudinal vertical section through an engine disclosing an embodiment of the invention certain parts being shown in full lines.
Figure 2:
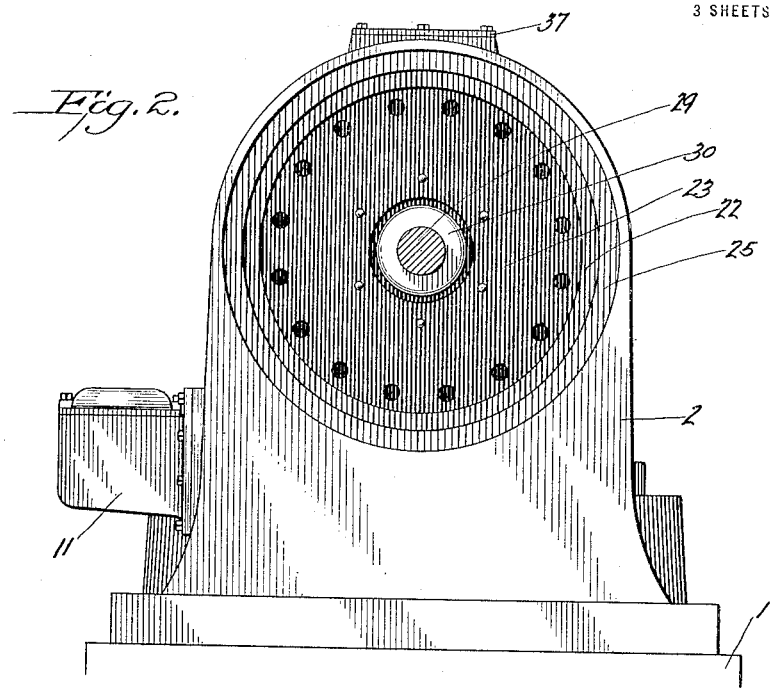
Fig. 2 is a transverse sectional view through Fig. 1 on line 2—2, same being on an enlarged scale.
Figure 3:
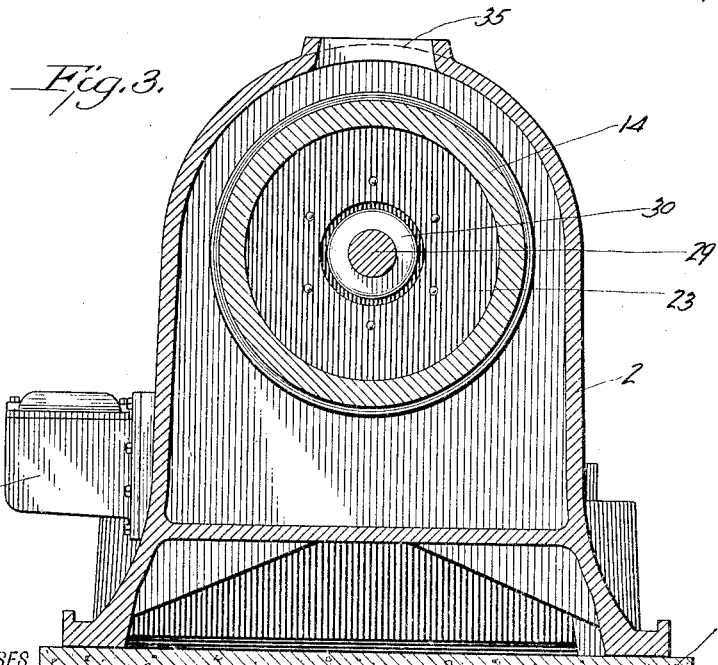
Fig. 3 is a sectional view through Fig. 1 on line 3—3, same being on an enlarged scale.
Figure 4:
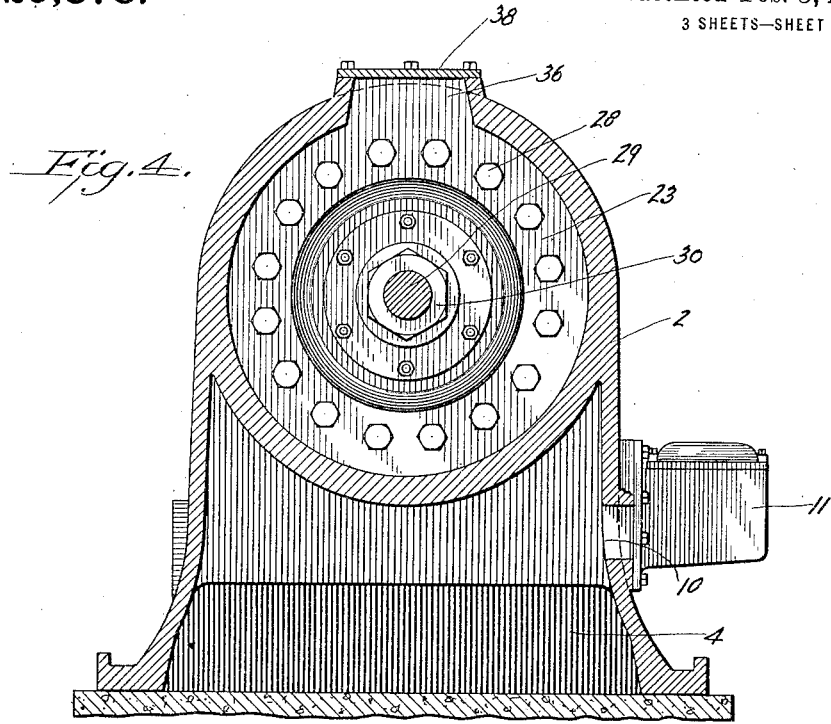
Fig. 4 is a sectional view through Fig. 1 on line 4—4, same being on an enlarged scale.

Referring to the accompanying drawings by numerals, 1 indicates a base of concrete or other suitable material on which the bed 2 is mounted, said bed secured thereto in any desired manner. The lower part of the bed 2 is made with an inclosing wall 3 so as to provide a heating chamber 4, said chamber receiving air from any suitable number of apertures 5 near the crank of the bed. The crank casing 6 extends downwardly into the chamber 4, and as the air passes through the openings 5 into the chamber said air will act on the crank casing and thereby maintain the lubricating oil 7 in a reasonably cooled condition. Reinforcing depending members 8 and 9 may be provided arranged to project into the chamber 4 so as to not only act as reinforcing members, but as retarding members for the air, whereby the air will become heated to an appreciable extent by the time it reaches the valve opening 10. As the engine operates air is drawn into the valve 11 through opening 10 and is discharged from valve 11 through opening 12 into the chamber 13, which chamber surrounds the forward end of the cylinder 14. Valve 11 is provided with a valve member for permitting the air to flow in one direction, namely, from the chamber 4 to chamber 13, and also to admit gas in proper proportion whereby the air and gas passing into chamber 13 will be the proper explosive mixture when fed into and compressed in the explosion chamber 19. This valve may be of any type, but preferably constructed like the valve disclosed in my co-pending application, Serial Number 203,749. The cylinder 14 is provided with any desired number of apertures 15 whereby when the piston 16 moves toward the compression stroke in a two-cycle engine air will be drawn into the cylinder 14 in back of the piston, said air passing from chamber 4 through valve 11 and through chamber 13 into the cylinder through apertures 15. Upon the explosion stroke the piston 16 of course moves toward the crank shaft 17 and compresses the air in the cylinder 14 so that part of the air will pass out of the cylinder through aperture 15 into chamber 13 and thereby produce air in said chamber under pressure so that as soon as the inlet port 18 has been cleared by the end of the piston said compressed air will rush into the firing chamber 19 and scavenge the same whereby the burnt gases will pass out the outlet 20. Preferably the valve 11 is fitted with a pipe for supplying gas from any suitable source which will mix with the air in the chamber 13 and consequently will be supplied to the combustion or explosion chamber when port 18 has been uncovered. It is, of course, understood that the gas will be supplied from gasolene, oil or from any other desired means without departing from the spirit of the invention, or the fuel may be injected into the cylinder direct and only air pass through the valve.

In regard to the cylinder 14 it will be observed that the internal bore thereof, is of course, the proper size for accommodating piston 16 while the external part is formed with a projection 21 adapted to fit into the shouldered extension 22 of the partition member 23 of the bed 2. The end 24 on the outer part of the cylinder fits against an annular shoulder 25 and into the flange 26. A gasket 27 is arranged against shoulder 25 so that the packing is at a point distant from the retaining bolts 28 extending through the wall 23 into the end of extension 21. In this way the usual flange and bolts arranged exteriorly of the bed and cylinder are eliminated, while at the same time there are two bearing surfaces for the cylinder for causing a proper centering or truing thereof. Where a cylinder is bolted directly on to a flange at the end of the bed care must be taken to cause the cylinder to properly aline, as the least unevenness in the packing has a tendency to prevent a true alining of the cylinder with the bed, which alining is necessary in order that the piston rod and associate parts may properly operate. By reason of the flange 26 and associate parts and the shouldered members 22 the cylinder automatically becomes alined when fitted into position, and all that is necessary to do is to tighten the bolts 28 in order to produce a proper gas-tight structure and a sufficient tension to hold the parts rigidly in position.

Figure 5:
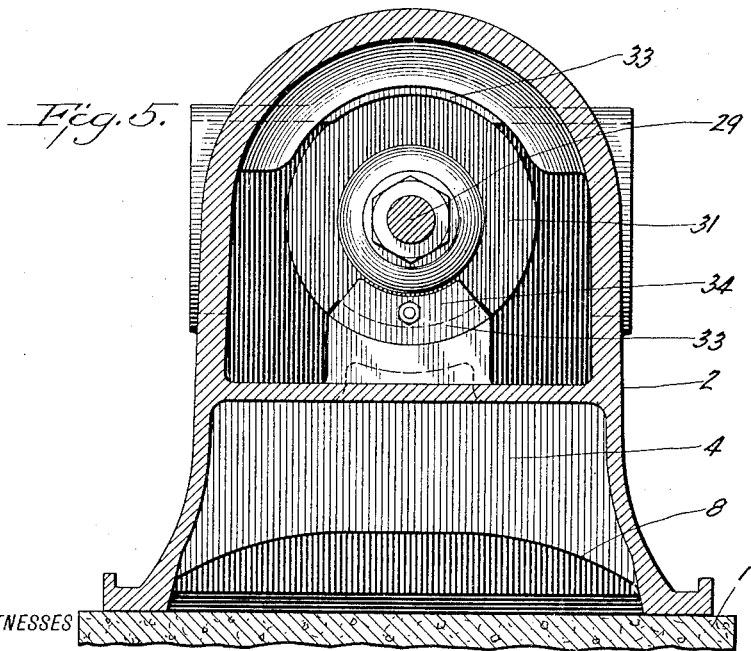
Fig. 5 is a sectional view through Fig. 1 on line 5—5, same being on an enlarged scale.

The piston 16 is provided with a piston rod 29 which extends through a suitable packing box 30 bolted or otherwise secured to the wall 23 so as to prevent any leakage between the interior of the cylinder 14 and the bed 2. Rod 29 extends through packing box 30 and is secured to a cross-head 31 which may be of different shape, but is preferably tubular, with one end closed for receiving rod 29, and the other end open for receiving the connecting rod 32. The cross-head 31 slides in the guides 33 which are preferably arc-shaped, the center of the arc coincident with a line drawn axially through the center of rod 29. A wearing plate 34 is provided which is in the form of a wedge for taking up lost motion and the usual wear, said wedge being arc-shaped to conform to the lower guide 33. If desired a wedge could be provided for the upper guide 33, though this is not ordinarily necessary. By providing the guides arc-shaped, and the head tubular, the cross-head is continually maintained in true position in line with the piston 16 while the walls of the bed 2 on each side of the guides are spaced a sufficient distance apart, as shown in Fig. 5, to permit the free circulation of air during the operation of the engine.

In order to facilitate the proper assembling of the parts, and for other purposes, the bed 2 is provided with openings 35 and 36 which are normally maintained closed and air-tight by covering plates 37 and 38. A similar opening 39 to opening 35 is provided in the cylinder 14, said opening being normally closed by a covering plate 40, bolted or otherwise rigidly secured in place.

What I claim is:

1. In an internal combustion engine of the character described, a bed provided with a bore having a shoulder adjacent the end thereof and a partition wall spaced from the end and having a recess, a cylinder of two diameters, one part supported in the bore of the bed and abutting the shoulder thereof and another part partially entering the recess, whereby the cylinder is automatically alined with the bed at two separate and distinct points, and bolts within the bed and extending through the partition into the end of the cylinder for clamping the cylinder in position.

2. In an internal combustion engine of the character described, a bed provided with a bore having a shoulder adjacent the end thereof and a partition spaced from the end, said partition having a recess and carrying a packing gland centrally thereof, a cylinder of two diameters, one part supported in the bore of the bed and abutting the shoulder thereof and another part partially entering the recess of the partition, bolts within the bed and extending through the partition into the end of the cylinder, a cross head in the bed, and a piston in the cylinder and having its piston rod extending through the packing gland of the partition and secured to the cross head.

DWIGHT O. BARRETT.